US012334669B2

(12) United States Patent
Bantz et al.

(10) Patent No.: US 12,334,669 B2
(45) Date of Patent: Jun. 17, 2025

(54) ARRANGEMENT FOR PRODUCING AN ELECTRICALLY CONDUCTIVE CONNECTION BETWEEN A FIRST MACHINE ELEMENT AND A SECOND MACHINE ELEMENT

(71) Applicant: Carl Freudenberg KG, Weinheim (DE)

(72) Inventors: Marlene Bantz, Edesheim (DE); Soeren Neuberger, Hockenheim (DE); Francois Colineau, Schallstadt-Leutersberg (DE); Guenter Hintenlang, Absteinach (DE); Gerhard Kutschera, Heppenheim (DE); Jens Hofmann, Mannheim (DE); Tim Herweck, Lampertheim (DE)

(73) Assignee: CARL FREUDENBERG KG, Weinheim (DE)

( * ) Notice: Subject to any disclaimer, the term of this patent is extended or adjusted under 35 U.S.C. 154(b) by 278 days.

(21) Appl. No.: 17/537,537

(22) Filed: Nov. 30, 2021

(65) Prior Publication Data

US 2022/0384986 A1 Dec. 1, 2022

(30) Foreign Application Priority Data

May 28, 2021 (DE) ............ 10 2021 113 901.5

(51) Int. Cl.
*H01R 4/64* (2006.01)
*F16J 15/3268* (2016.01)
*F16J 15/3284* (2016.01)
*H01R 13/52* (2006.01)

(52) U.S. Cl.
CPC ...... *H01R 13/5202* (2013.01); *F16J 15/3268* (2013.01); *F16J 15/3284* (2013.01)

(58) Field of Classification Search
CPC .... H01R 13/5202; H01R 13/64; H01R 39/00; H01R 39/64; H01R 4/60; H01R 4/643; F16J 15/3268; F16J 15/3284
See application file for complete search history.

(56) References Cited

U.S. PATENT DOCUMENTS

| | | | | |
|---|---|---|---|---|
| 2,648,883 A | * | 8/1953 | Dupre | H01R 4/50 |
| | | | | 403/314 |
| 2,992,323 A | * | 7/1961 | Fletcher | F21V 17/14 |
| | | | | 362/306 |
| 4,111,514 A | * | 9/1978 | Brishka | H01R 13/64 |
| | | | | 285/914 |

(Continued)

FOREIGN PATENT DOCUMENTS

| DE | 202012006612 U1 | 1/2013 |
|---|---|---|
| DE | 102016010926 A1 | 9/2017 |

(Continued)

*Primary Examiner* — Thanh Tam T Le
(74) *Attorney, Agent, or Firm* — LEYDIG, VOIT & MAYER, LTD.

(57) ABSTRACT

An arrangement for producing an electrically conductive connection between a first machine element and a second machine element, comprising an electrically conductive disk which is secured to a supporting body, wherein the disk is provided with a bore for receiving a second machine element, wherein slots are introduced into the disk starting from the peripheral edge of the bore.

15 Claims, 4 Drawing Sheets

(56) References Cited

U.S. PATENT DOCUMENTS

| | | | | |
|---|---|---|---|---|
| 4,427,255 A * | 1/1984 | Cox | F21S 41/194 | 362/296.01 |
| 4,500,946 A * | 2/1985 | Mikola | F21S 41/192 | 362/267 |
| 4,513,356 A * | 4/1985 | Mikola | F21S 41/198 | 362/267 |
| 4,682,274 A * | 7/1987 | Freudenreich | F21S 41/198 | 362/519 |
| 4,794,500 A * | 12/1988 | Bradley | F21S 41/194 | 362/519 |
| 4,819,142 A * | 4/1989 | Lothamer | F21S 41/194 | 362/519 |
| 4,851,976 A * | 7/1989 | McMahan | F21S 41/194 | 362/306 |
| 5,052,696 A * | 10/1991 | Hatch | F16J 15/3232 | 277/575 |
| 5,692,917 A * | 12/1997 | Rieb | H02J 7/00047 | 439/225 |
| 5,893,632 A * | 4/1999 | Kusagaya | H01R 33/46 | 362/438 |
| 7,073,794 B2 * | 7/2006 | Bock | G01M 3/045 | 277/320 |
| 7,357,669 B2 * | 4/2008 | Gabet | H01R 13/74 | 439/549 |
| 8,189,317 B2 * | 5/2012 | Oh | H02K 11/40 | 310/309 |
| 8,487,197 B2 * | 7/2013 | Smith | H02G 3/0691 | 439/271 |
| 9,246,289 B2 * | 1/2016 | Riedmaier | H01R 39/18 | |
| 9,388,904 B2 * | 7/2016 | Girardot | F16J 15/3268 | |
| 9,935,414 B2 * | 4/2018 | Luo | H02K 11/40 | |
| 10,840,778 B2 * | 11/2020 | van Bezooijen | H02K 7/003 | |
| 11,070,114 B2 * | 7/2021 | Lenz | H02K 11/40 | |
| 11,073,210 B2 * | 7/2021 | Hintenlang | F16C 3/023 | |
| 11,560,949 B2 * | 1/2023 | Hintenlang | F16J 15/3268 | |
| 2004/0245729 A1 | 12/2004 | Bock | | |
| 2012/0213544 A1 | 8/2012 | Ooyoshi | | |
| 2014/0041938 A1 | 2/2014 | Corbett et al. | | |
| 2014/0169870 A1 | 6/2014 | Pressler et al. | | |
| 2019/0109520 A1 | 4/2019 | Van Bezooijen | | |
| 2019/0120125 A1 | 4/2019 | Iizuka et al. | | |
| 2020/0103029 A1 | 4/2020 | Hintenlang | | |
| 2020/0295634 A1 | 9/2020 | Lenz | | |

FOREIGN PATENT DOCUMENTS

| | | |
|---|---|---|
| DE | 102017009360 A1 | 4/2019 |
| DE | 102018124256 A1 | 4/2020 |
| JP | 2004308906 A | 11/2004 |
| JP | 2012/215058 A | 11/2012 |
| JP | 2014-531561 A | 11/2014 |
| JP | 2015-165143 A | 9/2015 |
| WO | WO 2018/012104 A1 | 1/2018 |
| WO | WO 2019/181461 A1 | 9/2019 |

* cited by examiner

ARRANGEMENT FOR PRODUCING AN ELECTRICALLY CONDUCTIVE CONNECTION BETWEEN A FIRST MACHINE ELEMENT AND A SECOND MACHINE ELEMENT

CROSS-REFERENCE TO PRIOR APPLICATIONS

This application claims benefit to German Patent Application No. DE 10 2021 113 901.5, filed on May 28, 2021, which is hereby incorporated by reference herein.

FIELD

The invention relates to electrically conductive couplings.

BACKGROUND

DE 10 2018 124 256 A1 discloses an arrangement in which a sealing disk made of an electrically conductive non-woven material produces an electrically conductive connection between a first machine element and a second machine element. In this case, the first machine element and the second machine element can be components of an electric drive of a motor vehicle.

In the manner of a sealing disk, the electrically conductive disk contacts the inner machine element directly and the outer machine element at least indirectly via a support ring. The disk enables potential equalization between the first machine element and the second machine element and prevents mechanical damage which can occur when potentials of different sizes of the machine elements are compensated for by an electrical voltage breakdown. A voltage breakdown can cause a material removal from the machine element with a relatively lesser charge and a change in the material structure in the region in which the voltage breakdown takes place.

Depending on the design of the disk, the flexibility of the material of the disk is very limited such that the service life of the arrangement may be shortened and the wear of the second machine element against which the disk lies may be increased.

SUMMARY

In an embodiment, the present invention provides an arragment for producing an electrically conductive connection between a first machine element and a second machine element. The arrangemend includes an electrically conductive disk that is secured to a supporting body. The disk is provided with a bore for receiving the second machine element. Two or more slots are introduced into the disk from a peripheral edge of the bore.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
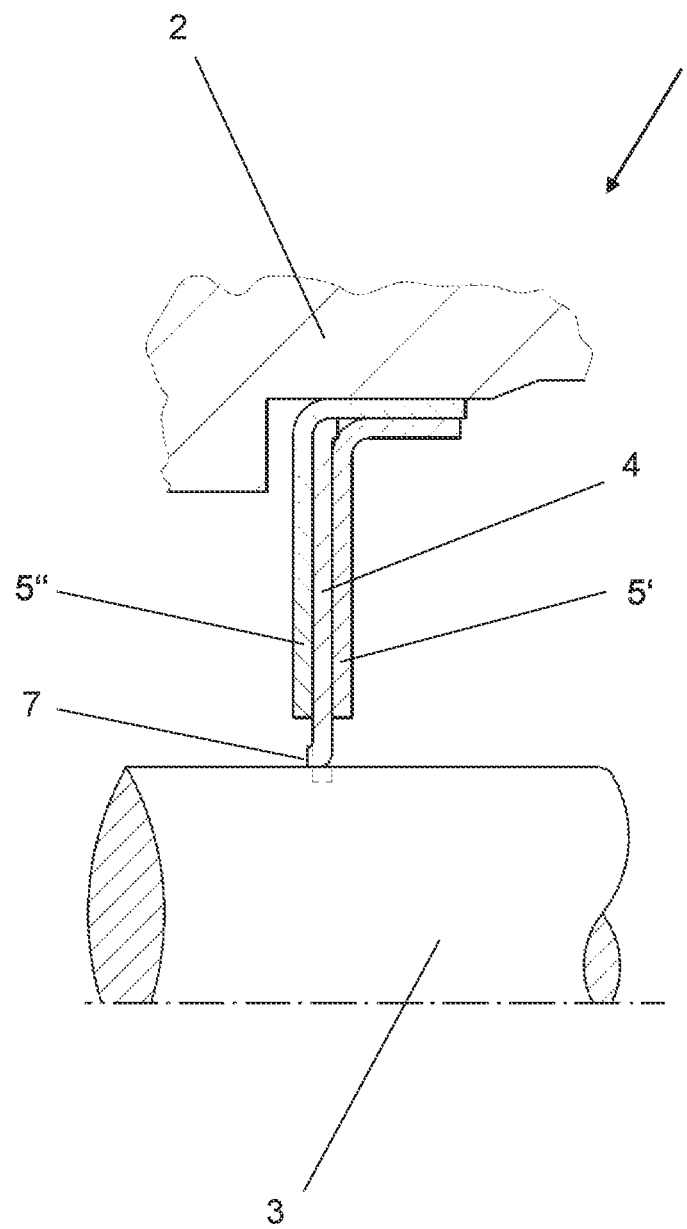
FIG. 1 depicts a cross-sectional view of an embodiment of the present disclosure.

In an embodiment, the present disclosure provides an arrangement for producing an electrically conductive connection which has a long operational life. The arrangement according to the invention for producing an electrically conductive connection between a first machine element and a second machine element comprises an electrically conductive disk, which is secured to a supporting body, wherein the disk is provided with a bore for receiving a second machine element, wherein slots are introduced into the disk starting from the peripheral edge of the bore.

As a result of the slots, the disk is more flexible on the inside and can therefore adapt better to the shape of the second machine element. In particular, it is advantageous that the pressing of the disk against the second machine element can be reduced so that the disk and the second machine element are subjected to less wear so that the arrangement has an extended operational life. At the same time, however, it is always ensured that the disk contacts the second machine element and that an electrically conductive connection exists between the first machine element and the second machine element. The second machine element may, for example, be a shaft leading out of a first machine element designed as a housing. The shaft may be a component of an electric drive of an electric vehicle.

The installed disk may lie against the second machine element under radial pretension and is bent in the axial direction at the free end. In the region of the slots, the disk spreads open, whereby the radial pressing of the disk against the second machine element is reduced.

The slots may run in the radial direction. When viewed in the circumferential direction, uniform properties thereby result, in particular with regard to the pressing of the disk against the machine element.

The disk may have a plurality of slots which are evenly distributed over the circumference of the disk. As a result, punctiform loads which can lead to premature wear can be avoided.

The slots can open into an expansion on the side facing away from the edge. The expansion can reduce the notch effect which occurs as a result of mechanical stress on the disk in the region of the slots and which can lead to further tearing of the slots. The expansion reduces the notch effect and results in improved mechanical properties overall. The expansion may be designed in the form of a circular recess, for example as a bore. As a result, the inner end of the slot is rounded, and improved mechanical properties result, in particular with respect to the operational life. A further improvement results if the diameter of the expansion is greater than the distance between the two edges delimiting the slot. In some embodiments, the expansion can also be oval or crescent-shaped.

Viewed over the circumference, every second slot can open into an expansion. In this embodiment, production is simplified so that the production of the disk is cost-effective.

The disk may be made of porous material. Porous materials have a low density and good mechanical properties. Particularly advantageous porous materials are non-woven materials. Non-woven materials have excellent mechanical properties and can be produced cost-effectively. For further improvement, the non-woven material can be impregnated with a sealing material, for example PTFE. In the embodiment with an impregnation made of sealing material, the disk can also function as a sealing disk.

To produce the electrical conductivity of the disk, the fibers of the non-woven material can consist of electrically conductive material or comprise an electrically conductive material, for example silver. It is also conceivable for the disk to be equipped with electrically conductive particles. For example, it is conceivable to provide the matrix of the non-woven material with electrically conductive particles. Electrically conductive particles can consist, for example, of conductive carbon black or of metal particles.

Particularly good electrical conductivity results if the disk is provided with an electrically conductive impregnation. Such electrically conductive impregnations are, for example, silver-containing dispersions, wherein the dispersion may be a latex dispersion provided with silver particles. In this case, the impregnation may only partially penetrate the disk, for example on one side, or completely penetrate the disk. In the case of a conductive impregnation, it is particularly advantageous that conductivity also exists when material removal has resulted from wear on the disk. Depending on the embodiment of the impregnation, the problem can arise that the flexibility and bending ability of the disk is reduced which, in the installed state of the disk, is accompanied by an increased pressing of the disk against the second machine element. However, by means of the slots introduced into the disk according to the present disclosure, the disk can spread open when the disk is pushed onto the second machine element. This reduces the pressing of the disk against the second machine element so that friction and wear are reduced.

The supporting body is preferably designed to be electrically conductive. In some embodiments, it is possible for the disk not to be secured directly to the first machine element but to electrically contact the first machine element via the supporting body. In this case, the supporting body can have an inner ring and an outer ring, wherein the disk is secured between the inner ring and the outer ring. In some embodiments, the disk can be secured to the support ring by means of a clamping connection so that the arrangement can be produced particularly simply and cost-effectively.

The extension of the slots in the radial direction may be between 25 percent and 75 percent of the extension of the disk from the bore to the outer edge. In some embodiments, the extension of the slots in the radial direction is 50 percent of the extension of the disk from the bore to the outer edge. This embodiment results in an arrangement with particularly low wear and simultaneously low electrical resistance between the first machine element and the second machine element.

The edges that face each other of the slots may be spaced apart from each other. In the uninstalled, unloaded state, the edges of the slots of the disk are spaced apart from each other. In connection with the arrangement of bores on the side facing away from the edge, a keyhole-like design of the slots results, which is accompanied by particularly advantageous mechanical properties and a long service life of the disk.

Some embodiments of the arrangement according to the invention are explained in more detail below with reference to the figures. These show, in each case schematically:

FIG. 1 shows an arrangement 1 for producing an electrically conductive connection between a first machine element 2 and a second machine element 3. In the present embodiment, the first machine element 2 is a housing, and the second machine element 3 is a rotatably mounted shaft. The housing and shaft form a component of an electric drive for an electric vehicle.

The arrangement 1 further comprises an electrically conductive disk 4 consisting of a non-woven material soaked with PFTE. In this respect, the disk 4 also functions as a sealing disk for sealing the gap between the first machine element 2 and the second machine element 3. To produce the electrical conductivity, the disk 4 is provided with a silver-containing impregnation. In some embodiments, the impregnation is a latex dispersion provided with silver particles, wherein the impregnation completely penetrates the disk 4.

The disk 4 is provided with a bore 6 for receiving the second machine element 3. The supporting body 5 has an inner ring 5' and an outer ring 5", wherein the disk 4 is secured between the inner ring 5' and the outer ring 5". The supporting body 5, together with the inner ring 5' and the outer ring 5", is designed to be electrically conductive and consists of a steel material.

In the installed state, the disk 4 rests with radial pretension against the second machine element 3 and is bent in the axial direction at the free end. The slots 8 introduced into the disk 4 spread open.

Figure 2:
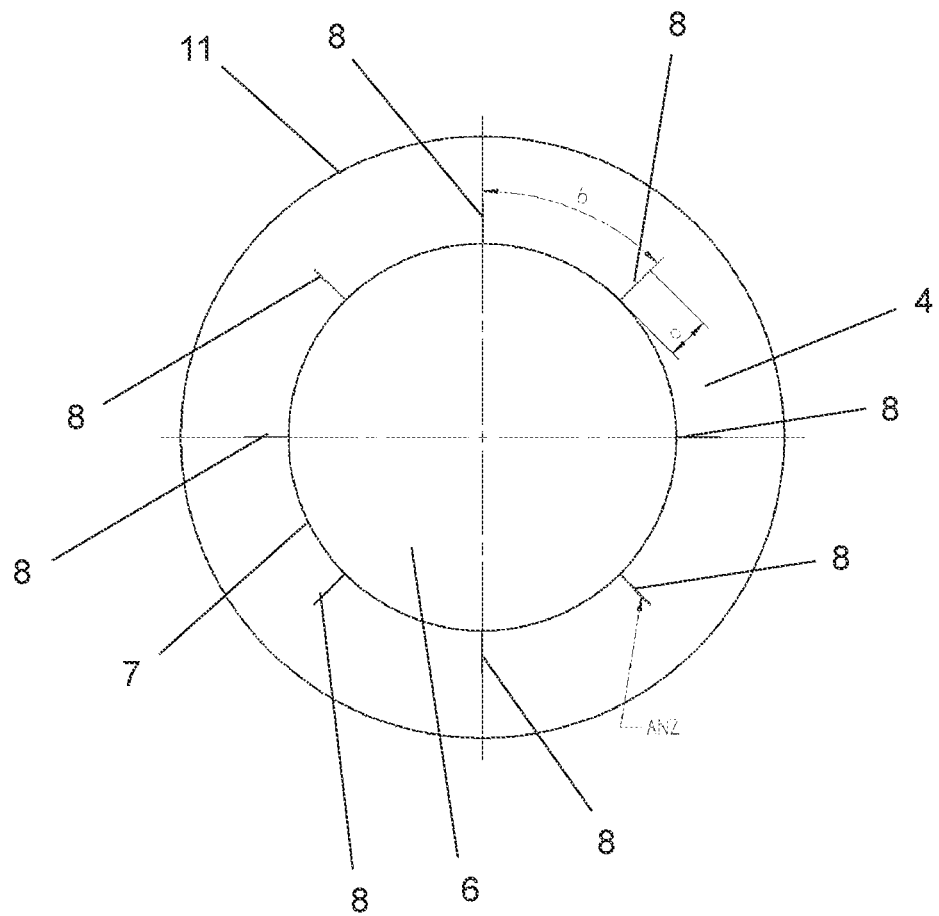
FIG. 2 in plan view, depicts a disk with slots distributed over the circumference.

FIG. 2 shows an embodiment of a disk 4 for the arrangement 1 shown in FIG. 1. In the disk 4 shown in FIG. 2, slots 8 are introduced into the disk 4 starting from the peripheral edge 7 of the bore 6. The slots 8 run in the radial direction and are evenly distributed over the edge of the disk 4. The extension of the slots 8 in the radial direction is 50 percent of the extension of the disk 4 from the bore 6 to the outer edge 11.

Figure 3:
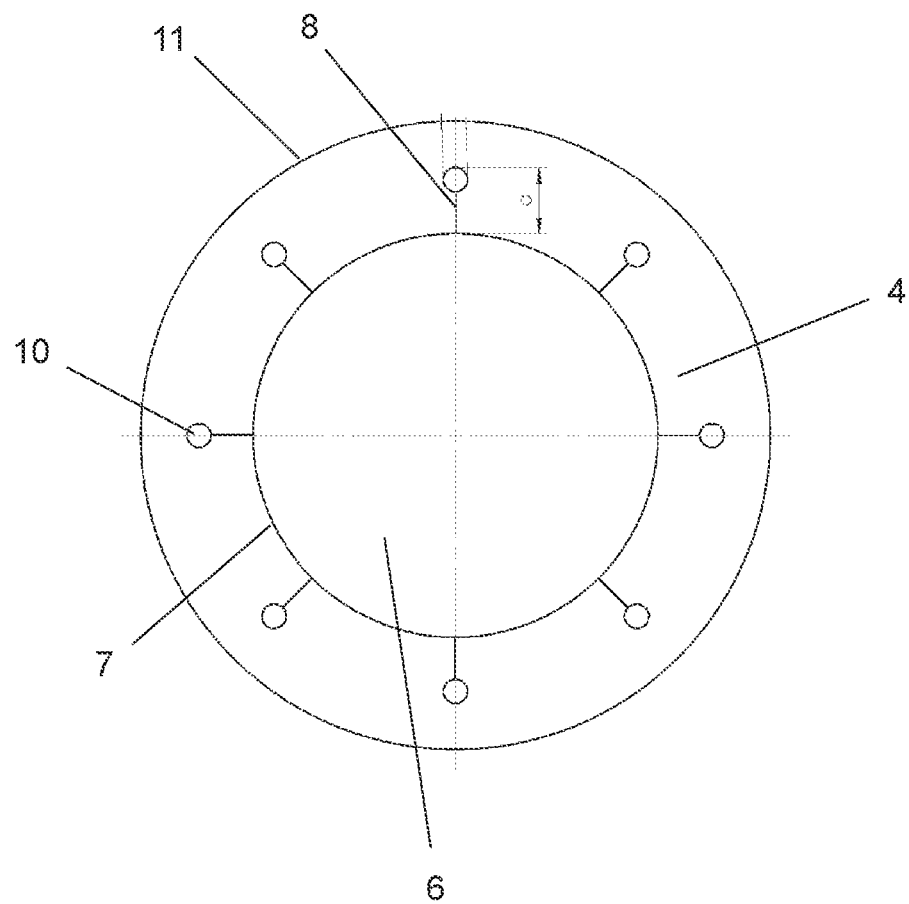
FIG. 3 in plan view, depicts a disk with slots distributed over the circumference.

FIG. 3 shows a development of the disk 4 shown in FIG. 2. In the disk 4 shown in FIG. 3, the slots 8 open into an expansion 10 on the side facing away from the edge 7. The expansion 10 is circular in the form of a bore. The diameter of the circular expansion 10 is greater than the distance between the two edges 12 delimiting the slot 8.

Figure 4:
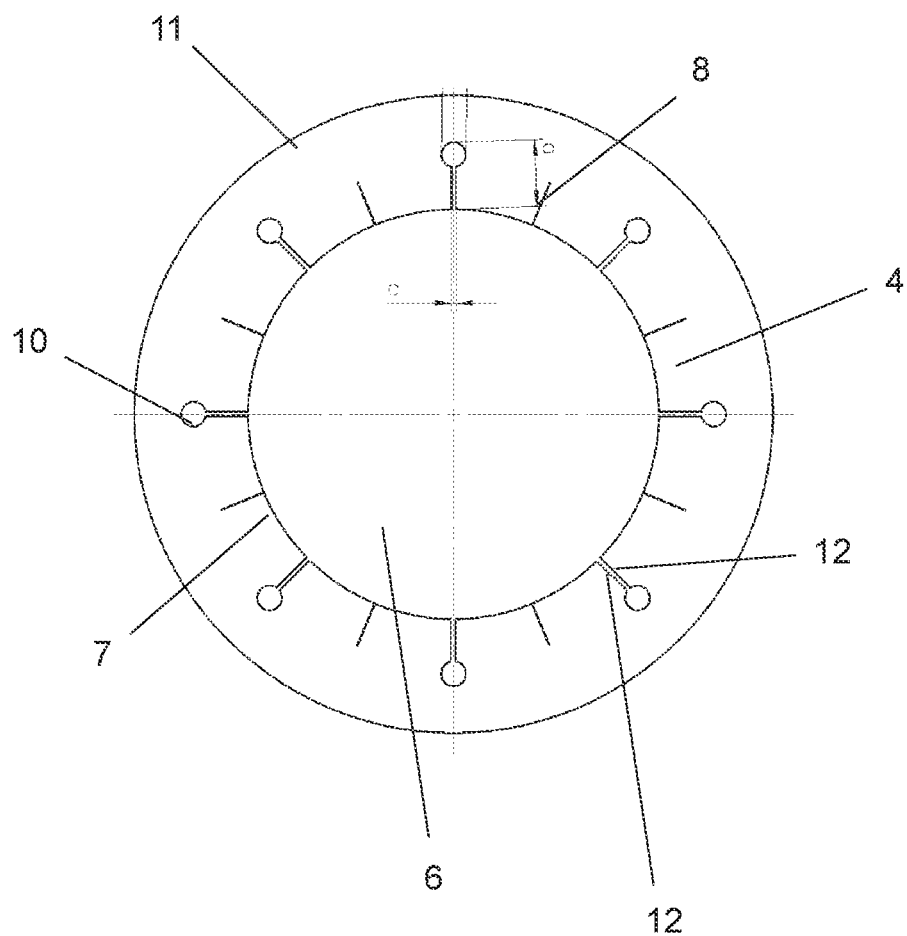
FIG. 4 in plan view, depicts a disk in which every second slot opens into an expansion, and edges that face each other of the slots are spaced apart from each other.

FIG. 4 shows a development of the disk 4 shown in FIG. 2 or FIG. 3. In the disk 4 shown in FIG. 4, when viewed over the circumference, every second slot 8 opens in an expansion 10. In the case of the slots 8 equipped with the expansion 10, the edges 12 that face each other of the slots 8 are furthermore spaced apart from each other. In principle, however, it is also conceivable for each slot 8 of the disk 4 to be equipped with an expansion 10, wherein the edges 12 that face each other of the slots 8 are spaced apart from each other in each case.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An arrangement for producing an electrically conductive connection between a first machine element and a second machine element, comprising:
   an electrically conductive disk which is secured to a supporting body, the electrically conductive disk comprising a non-woven impregnated with an electrically conductive material,
   wherein the disk is provided with a bore for receiving the second machine element,
   wherein two or more slots are introduced into the disk starting from a peripheral edge of the bore,
   wherein one or more of the slots open into an expansion on a side facing radially away from the peripheral edge, and
   wherein each expansion is circular and has a circumferential width that is greater than a circumferential distance between two radially extending edges delimiting a respective one of the one or more slots.

2. The arrangement according to claim 1, wherein the slots extend in a radial direction.

3. The arrangement according to claim 1, wherein the slots are evenly distributed over a circumference of the disk.

4. The arrangement according to claim 1, wherein, when viewed over a circumference of the disk, every second slot opens into one of the one or more expansions.

5. The arrangement according to claim 4, wherein every other slot does not open into an expansion.

6. The arrangement according to claim 4, wherein the expansions are circular, and wherein a diameter of each of the expansions is greater than the distance between two edges delimiting the slot.

7. The arrangement according to claim 1, wherein the disk is made of porous material.

8. The arrangement according to claim 1, wherein the supporting body is configured to be electrically conductive.

9. The arrangement according to claim 1, wherein the supporting body comprises an inner ring and an outer ring, and wherein the disk is secured between the inner ring and the outer ring.

10. The arrangement according to claim 1, wherein the extension of the slots in a radial direction is between 25 percent and 75 percent of an extension of the disk from the bore to an outer edge of the disk.

11. The arrangement according to claim 10, wherein the extension of the slots in a radial direction is at a midpoint of a radial extension of the disk from the bore to the outer edge of the disk.

12. The arrangement according to claim 1, wherein each of the slots comprise inner edges that face each other and are spaced apart from each other.

13. The arrangement according to claim 1, wherein every slot opens into one of the one or more expansions.

14. The arrangement according to claim 1, wherein each expansion is configured to reduce a notch effect resulting from mechanical stress in the disk at a respective slot.

15. The arrangement according to claim 1, wherein the conductive material with which the disk is impregnated completely penetrates the disk.

* * * * *